(12) United States Patent
Bellinger et al.

(10) Patent No.: US 6,577,938 B1
(45) Date of Patent: Jun. 10, 2003

(54) SYSTEM FOR SELECTING BETWEEN AUTOMATIC AND MANUAL CONTROL OF A NUMBER OF GEAR RATIOS OF A SEMIAUTOMATIC TRANSMISSION

(75) Inventors: Steven M. Bellinger, Columbus, IN (US); David J. Munt, Columbus, IN (US)

(73) Assignee: Cummins, Inc., Columbus, IN (US)

(*) Notice: Subject to any disclaimer, the term of this patent is extended or adjusted under 35 U.S.C. 154(b) by 725 days.

(21) Appl. No.: 08/944,807

(22) Filed: Oct. 6, 1997

(51) Int. Cl.[7] ................................................ G06F 7/00
(52) U.S. Cl. ..................... 701/52; 701/51; 477/111; 477/124
(58) Field of Search .............................. 701/51, 52, 53, 701/55, 59; 477/108, 906, 107, 111, 91, 78, 79, 86, 169, 115, 125; 73/339, 375, 473.25, 473.26; 74/335, 336 R

(56) References Cited

U.S. PATENT DOCUMENTS

| | | | |
|---|---|---|---|
| 4,495,457 A | | 1/1985 | Stahl ............................ 701/62 |
| 4,930,078 A | * | 5/1990 | Dunkley et al. ............... 701/52 |
| 4,991,099 A | | 2/1991 | Markyvech et al. ........... 701/52 |
| 5,050,079 A | | 9/1991 | Steeby ........................ 701/52 |
| 5,053,961 A | | 10/1991 | Genise ........................ 701/52 |
| 5,053,962 A | | 10/1991 | Genise ........................ 701/52 |
| 5,089,965 A | | 2/1992 | Braun ......................... 701/52 |
| 5,105,357 A | | 4/1992 | Steeby ........................ 701/62 |
| 5,233,525 A | | 8/1993 | Overmann et al. ........... 701/55 |
| 5,315,514 A | | 5/1994 | Steeby et al. ................. 701/52 |
| 5,335,566 A | | 8/1994 | Genise et al. ............... 477/124 |
| 5,393,277 A | | 2/1995 | White et al. ................ 477/108 |
| 5,416,700 A | | 5/1995 | Bates et al. ................... 701/52 |
| 5,444,623 A | | 8/1995 | Genise ........................ 701/52 |
| 5,498,195 A | | 3/1996 | White et al. ................ 477/110 |
| 5,564,999 A | | 10/1996 | Bellinger et al. ........... 477/111 |
| 5,591,102 A | | 1/1997 | White et al. ................ 477/107 |
| 5,609,548 A | | 3/1997 | White et al. ................ 477/124 |
| 5,638,271 A | * | 6/1997 | White et al. .................. 701/66 |
| 5,738,606 A | * | 4/1998 | Bellinger .................... 477/111 |
| RE36,007 E | * | 12/1998 | White et al. .................. 477/91 |
| RE36,186 E | * | 4/1999 | White et al. ................ 477/108 |

OTHER PUBLICATIONS

Brochure entitled "Introducing the Direct Drive Super 10 Top 2™", Eaton Corporation, 1996.

* cited by examiner

*Primary Examiner*—Jacques H. Louis-Jacques
(74) *Attorney, Agent, or Firm*—Barnes & Thornburg

(57) ABSTRACT

A system for selecting between automatic and manual control of a number of gear ratios of a semiautomatic transmission includes an internal combustion engine coupled to a semiautomatic transmission having a number of manually selectable gear ratios and a number of automatically selectable gear ratios wherein the engine and transmission are both subject to management and control thereof by a control computer. A memory unit includes a software algorithm for controlling shifting between the automatically selectable gear ratios and the control computer is operable to execute the software algorithm. A switch is provided, which is preferably a cruise control enable/disable switch, wherein the control computer is responsive to a cruise control disable position of the switch to inhibit execution of the software algorithm and thereby subject the automatically selectable gear ratios to manual control thereof. The control computer is also responsive to a cruise control enable position of the switch to allow execution of the software algorithm to thereby subject the automatically selectable gear ratios to automatic control thereof. In one embodiment, the software algorithm is only inhibited after it has been determined that the engine fueling rate is below a fueling rate threshold if one of the automatically selectable gear ratios is currently engaged. According to another aspect of the invention, a gear down protection algorithm is instituted whenever the software algorithm for controlling automatic gear selection is disabled.

11 Claims, 3 Drawing Sheets

SYSTEM FOR SELECTING BETWEEN AUTOMATIC AND MANUAL CONTROL OF A NUMBER OF GEAR RATIOS OF A SEMIAUTOMATIC TRANSMISSION

FIELD OF THE INVENTION

The present invention relates generally to systems for controlling semiautomatic transmissions, and more specifically to systems for switching between manual and automatic control modes of a number of top gears of a semiautomatic transmission.

BACKGROUND OF THE INVENTION

Semiautomatic transmissions, which are defined for purposes of the present invention as transmissions having a number of manually selectable gear ratios and a number of automatically selectable gear ratios, are known and widely used, particularly in the heavy duty truck industry. In vehicles including such transmissions, a control computer is typically provided for controlling the shifting between the automatically selectable gear ratios in accordance with various engine and vehicle operating conditions.

One specific embodiment of the foregoing class of transmissions is commonly referred to as a "TOP-2" transmission, wherein a number of the numerically higher gear ratios (i.e. numerically lower gears such as 1st, 2nd, 3rd, etc.) are manually selectable, and shifting between the numerically lowest two gear ratios (i.e. numerically highest gears or Top-2 gears) is managed by a control computer pursuant to a gear shifting control algorithm. Examples of such Top-2 type transmissions and control algorithms therefore are given in U.S. Pat. Nos. 5,393,276, 5,393,277, 5,401,223, 5,498,195, 5,591,102, 5,609,548 and 5,638,271 to White et al., each of which are assigned to the assignee of the present invention, the disclosures of which are incorporated herein by reference.

While the foregoing Top-2 type transmissions and controls therefore have been well received in the heavy duty truck industry, they have a number of drawbacks associated with the operation thereof. For example, some drivers of such vehicles perceive the automatic control of the Top-2 gears as dangerous under certain operating conditions such as when traveling on slippery roads. Accordingly, what is needed is a system for allowing driver selectability of Top-2 or non-Top-2 operation, i.e. switchability between manual and automatic control of the Top-2 gears, or at least a system for allowing a fleet owner/manager to enable/disable automatic control of the Top-2 gears via a service tool not available to the driver. Under conditions wherein shifting between the Top-2 gears is not automatically controlled via a control computer pursuant to a Top-2 control algorithm, but is rather manually controlled by the driver in accordance with known techniques, it would further be preferable to institute control over the maximum steady state vehicle or engine speeds during Top-2 gear operation.

SUMMARY OF THE INVENTION

The foregoing shortcomings of the prior art are addressed by the present invention. In accordance with one aspect of the present invention, a system for selecting between automatic and manual control of a number of gear ratios of a semiautomatic transmission comprises an internal combustion engine coupled to a semiautomatic transmission having a number of manually selectable gear ratios and a number of automatically selectable gear ratios, means for determining an engine fueling rate, a switch having a first switch position and a second switch position, a memory unit including a software algorithm for controlling shifting between the number of automatically selectable gear ratios, and a control computer. The control computer is responsive to the first switch position to execute the software algorithm and thereby control shifting between the automatically selectable gear ratios, and is responsive to the second switch position to inhibit execution of the software algorithm if the engine is currently engaged with one of the number of automatically selectable gear ratios and the fueling rate is less than a threshold fueling rate.

In accordance with another aspect of the present invention, a system for selecting between automatic and manual control of a number of gear ratios of a semiautomatic transmission comprises an internal combustion engine coupled to a semiautomatic transmission having a number of manually selectable gear ratios and a number of automatically selectable gear ratios, means for determining engine load, means for determining one of engine speed and vehicle road speed, a memory unit including a software algorithm for controlling shifting between the number of automatically selectable gear ratios, and a control computer. The control computer is operable in a first mode to execute the software algorithm and thereby control shifting between the number of automatically selectable gear ratios, and in a second mode to inhibit execution of the software algorithm such that the number of automatically selectable gear ratios are manually selectable. The control computer is further operable in the second mode to determine a currently selected gear ratio of the transmission and reduce one of an engine speed limit and vehicle speed limit if a numerically lowest one of the selectable gear ratios is not currently selected and the engine load is below an engine load threshold, and to further reduce one of engine speed and vehicle speed if the one of engine speed and vehicle speed is above a corresponding one of the engine speed and vehicle speed limit.

One object of the present invention is to provide a system for selecting between automatic and manual control of a number of gear ratios of a semiautomatic transmission.

Another object of the present invention is to provide such a system wherein a gear down protection algorithm is instituted whenever control of the number of gear ratios of the semiautomatic transmission is switched to manual control thereof.

These and other objects of the present invention will become more apparent from the following description of the preferred embodiments.

DESCRIPTION OF THE PREFERRED EMBODIMENTS

Figure 1:
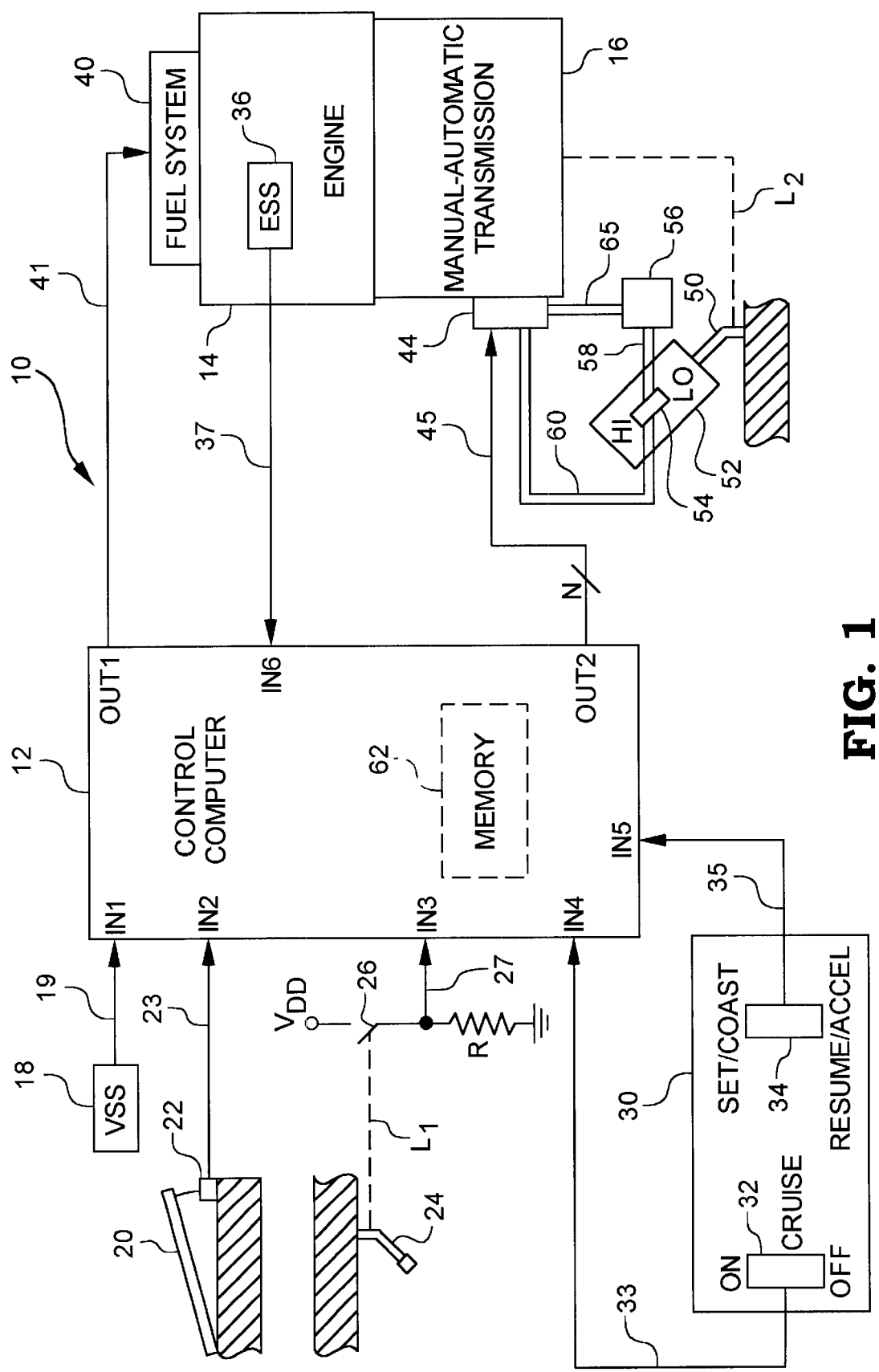
FIG. 1 is a diagrammatic illustration of one embodiment of a system for selecting between automatic and manual control of a number of gear ratios of a semiautomatic transmission, in accordance with one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, one preferred embodiment of a vehicular control system 10 for carrying out the principles of the present invention is illustrated. System 10 includes a control computer 12 which is operable to control an engine 14 and a transmission 16 connected thereto, as is known in the art. Control computer 12 is often referred to as an engine control module (ECM), engine control unit (ECU) or the like, is preferably microprocessor-based and includes a memory unit 62. Control computer 12 is operable, as is notoriously well known in the art, to control and manage many vehicular operations, such as those associated with the operation of the engine 14 and transmission 16, in accordance with software algorithms and operational data typically stored within memory unit 62.

Many engine/vehicle sensors, switches and other vehicle/engine components interface with control computer 12 during the operation thereof, and some examples of such components, as they relate to the present invention, are illustrated in FIG. 1. For example, control system 10 includes a vehicle speed sensor (VSS) 18 electrically connected to an input IN1 of control computer 12 via signal path 19. Vehicle speed sensor 18 is operable to sense vehicle speed and provide a vehicle speed signal to control computer 12 corresponding thereto. In one embodiment, vehicle speed sensor 18 is a variable reluctance sensor positioned about a tailshaft (not shown) extending from transmission 16, although the present invention contemplates that the vehicle speed sensor 18 may be any known sensor positioned at a suitable vehicle location, wherein such a sensor is operable to provide control computer 10 with a signal indicative of vehicle speed.

System 10 further includes an accelerator pedal 20 having a pedal position sensor 22 associated therewith which is electrically connected to input IN2 of control computer 12 via signal path 23. Pedal position sensor 20 is responsive to the position of accelerator pedal 20 to provide an accelerator pedal position signal to control computer 12 via input IN2. In one embodiment, the accelerator pedal position sensor 22 is a potentiometer connected at one end to a suitable voltage (such as 5 or 12 volts) and at an opposite end to ground potential. The wiper of such a potentiometer is mechanically coupled to the accelerator pedal 20, as is known in the art, and is electrically connected to signal path 23 so that the voltage present on signal path 23 is directly proportional to accelerator pedal position. Those skilled in the art will, however, appreciate that other known accelerator pedal position sensors may be used to provide the accelerator pedal position signal to control computer 12, wherein examples of some such components include, but are not limited to, pressure sensors, magnetic or HALL effect sensors and the like.

System 10 further includes a service brake 24, mechanically coupled to a service brake sensor via linkage $L_1$, wherein the service brake sensor is responsive to a predetermined position of brake 24 to provide a service brake signal indicative of service brake actuation to input IN3 of control computer 12 via signal path 27. In one embodiment, the service brake sensor includes a switch 26 mechanically coupled to the service brake via linkage $L_1$, wherein the switch 26 is electrically connected at one end thereof to a suitable voltage source VDD and at an opposite end to a resistor R coupled to ground potential. The signal path 27 is electrically connected to the common connection of the switch 26 and resistor R. Switch 26 is preferably normally open so that signal path 27 is pulled to ground potential whenever the service brake 24 has not been depressed beyond a predetermined position. When the service brake 24 is depressed beyond the predetermined position, switch 26 closes thereby impressing the voltage VDD upon signal path 27. Control computer 12 is thus responsive to the voltage level on signal path 27 to determine therefrom whether the service brake 24 is depressed beyond the predetermined position. It is to be understood, however, that the present invention contemplates configuring switch 26 and resistor R in an opposite configuration (i.e. such that signal path 27 is pulled up to VDD whenever the service brake has not been depressed beyond the predetermined position, and signal path 27 is pulled down to ground potential upon the closing of switch 26), and further contemplates that other known sensors may be provided to determine depression of the service brake 24 beyond a predetermined position and provide a service brake signal corresponding thereto upon signal path 27.

System 10 further includes a vehicle cruise control unit 30 operable as is known in the art to provide control computer 12 with signals corresponding to desired road speed. Control computer 12 is, in turn, responsive to the signals provided by cruise control unit 30 to fuel the engine 14 accordingly, Cruise control unit 30 includes an ON/OFF switch 32 that is electrically connected to input IN4 of control computer 12 via signal path 33. Preferably, ON/OFF switch 32 is a known single pole single throw switch. Cruise control unit 30 also includes a multifunction switch 34 that is electrically connected to input IN5 of control computer 12 via signal path 35. Preferably, switch 34 is a known center-off switch having a SET/CRUISE position and a RESUME/ACCEL position. Control computer 12 is responsive to an appropriate signal on signal path 35 to perform the known SET, COAST, RESUME and ACCEL operational modes associated with cruise control system 30. In accordance with operator actuation of ON/OFF switch 32, a corresponding signal is provided on signal path 33 to which control computer 12 is responsive to enable operation of cruise control system 30. As is known in the art, actuation of ON/OFF switch 32 from the OFF position to the ON position has no discernible affect on vehicle or engine operation, and only provides an appropriate signal on signal path 33 to which control computer 12 is responsive to enable processing of further cruise control signals provided on signal path 35, thereby allowing subsequent operation of cruise control system 30 as is known in the art. Actuation of the ON/OFF switch 32 from the ON position to the OFF position conversely provides a signal on signal path 33 to which control computer 12 is responsive to disable further operation of cruise control system 30. When ON/OFF switch 32 is in the OFF position, control computer 12 is accordingly non-responsive to any signals provided on signal path 35.

The engine 14 is preferably an internal combustion engine and includes an engine speed sensor 36 associated therewith which is electrically connected to input IN6 of control computer 12 via signal path 37. The engine speed sensor (ESS) 36 is operable to sense engine rotational speed (typically in RPMs) and/or engine position (typically in degrees relative to TDC), and provide an engine speed signal corresponding thereto on signal path 37. In one embodiment, engine speed sensor 36 is a HALL effect sensor responsive to passage thereby of a number of teeth of a gear or wheel rotating in synchronism with the engine 14, to provide the engine speed signal on signal path 37. Those skilled in the art will, however, appreciate that engine speed sensor 36 may alternatively be a variable reluctance or other known sensor operable to sense engine speed and/or position and provide a corresponding engine speed signal.

Control computer 12 includes a first output OUT1 electrically connected to a fuel system 40, associated with the engine 14, via signal path 41. Fuel system 40 may be any known fuel system including one or more fuel injectors, etc., and is responsive to fuel control signals provided thereto by control computer 12 on signal path 41 to fuel the engine 14 accordingly.

Transmission 16 is, in accordance with the present invention, a manual-automatic transmission having a number of manually selectable gear ratios and a number of automatically selectable gear ratios. Transmission 16 includes a transmission control unit 44 having a number of electrical signal inputs connected to an output port OUT2 of control computer 12 via a number, N, of signal paths 45, wherein N may be any integer. Transmission control unit 44 is responsive to control signals provided by control computer 12 on signal paths 45 to control automatic shifting between the number of automatically selectable gear ratios of transmission 16 as is known in the art.

A manual gear shifting lever 50, suitably located in the cab area of the vehicle, is mechanically coupled to transmission 16 via linkage $L_2$, and is manually actuatable by a vehicle operator to control manual shifting of transmission 16 between the number of manually selectable gear ratios thereof, as is known in the art.

Manual-automatic transmission 16 is, in accordance with the present invention, a splitter-type transmission, defined here as a known transmission having a shift actuator, typically referred to as a splitter clutch, that is actuatable either manually by the vehicle operator or automatically under the control of control computer 12 pursuant to an automatic shifting control algorithm, to accomplish shifting between the transmission gear ratios. To accomplish shifting between manually selectable gear ratios, gear shifting lever 50 includes a control section 52 having a two-position splitter switch 54, preferably connected on one side thereof to a source of pressurized air 56 via conduit 58, and on an opposite side to transmission control unit 44 via conduit 60. In one specific embodiment of transmission 16, air source 56 is also connected directly to transmission control unit 44 via conduit 65. The operation of transmission control unit 44, as it relates to controlling the shifting of transmission 16, will be described in greater detail hereinafter.

Switch 54 has a LO position which controls passage therethrough of pressurized air from air source 56, as is known in the art, to cause transmission control unit 44 to actuate a shift actuator (element 78 of FIG. 2A) to thereby cause the transmission 16 to shift to a numerically lower gear, and has a HI position which similarly controls passage therethrough of the pressurized air, as is known in the art, to cause transmission control unit 44 to actuate the shift actuator to thereby cause transmission 16 to shift to a numerically higher gear. Transmission control unit 44 is responsive, in an automatic shifting mode, to control signals provided by control computer 12 at output OUT2 to disable any effect thereon of switch 54 and control the actuation of the shift actuator 78 in accordance with the control signals.

Figure 2A:
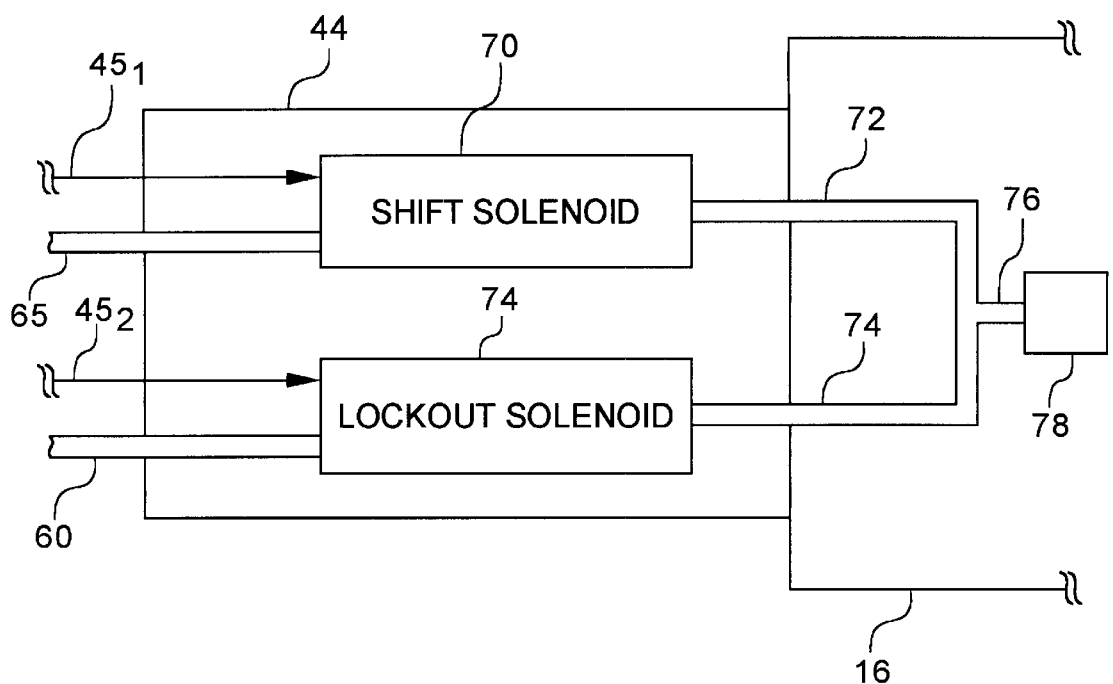
FIG. 2A is a diagrammatic illustration of one embodiment of a semiautomatic transmission, and controls therefore, for use with the present invention.

Referring now to FIG. 2A, one embodiment of a transmission 16 and associated transmission control unit 44, in accordance with the present invention, is shown. The transmission 16 illustrated in FIG. 2A is preferably a "Top-2" transmission, as this term is defined hereinabove, and is manufactured by Eaton Corporation as a series RTL-1x710B-T2 AutoRange 10-speed transmission (wherein x may be 1, 2, 3 or 4), although those skilled in the art will recognize that transmission 16 may be any semiautomatic transmission utilizing a splitter clutch or similar shift actuator to accomplish shifting between the automatically selectable gear ratios. Details of transmission control unit 44, as described hereinafter, could thus be easily modified by a skilled artisan to accommodate a manual-automatic transmission having more or less than 2 automatically selectable gear ratios. Details of the splitter clutch or shift actuator 78 associated with transmission 16 are known and not critical to the description of the present invention, and a detailed illustration thereof has accordingly been omitted from FIG. 2A for brevity.

The transmission control unit 44 for the particular Top-2 transmission 16 under discussion includes a first solenoid-controlled valve 70 (hereinafter shift solenoid) having one of the signal paths $45_1$, from output OUT2 of control computer 12 electrically connected thereto, and a second solenoid-controlled valve 74 (hereinafter lockout solenoid) having another one of the signal paths $45_2$ from OUT2 electrically connected thereto. Pressurized air conduit 65 (coupled to air source 56 of FIG. 1) is coupled to the shift solenoid 70 and the air conduit 60 coupled to splitter switch 54 is coupled to the lockout solenoid 74. Air conduit 72 extends from shift solenoid 70 and air conduit 75 extends from lockout solenoid 74. Air conduits 72 and 75 feed a single conduit 76 that is coupled to a shift actuator 78 which, in the particular embodiment of transmission 16 discussed above, is preferably a pneumatically-controlled splitter clutch. It is to be understood, however, that the present invention contemplates that the splitter clutch may alternatively be an electronically-controlled pneumatic splitter clutch or a strictly electronically-controlled splitter clutch.

During manual operation of transmission 16; i.e. driver-controlled shifting, control computer 12 provides signals on signal paths $45_1$ and $45_2$ to de-energize the solenoids of both solenoid-controlled valves 70 and 74. With the solenoids so deactuated, conduit 65 is isolated from conduit 72 and conduit 60 is coupled to conduit 75. Control over the shift actuator 78 during manual operation of transmission is thus controlled by the splitter switch 54 as will be described in greater detail hereinafter.

During automatic operation of transmission 16; i.e. computer controlled shifting, control computer 12 provides signals on signal paths $45_1$ and $45_2$ to control the solenoids 70 and 74 in accordance with the desired gear ratio. For example, if the lower of the Top-2 gears (i.e. 9th gear) is requested, the lockout solenoid 74 is energized thereby isolating conduit 60 from conduit 75, and shift solenoid 70 is de-energized thereby isolating conduit 65 from conduit 72. By energizing solenoid 74, conduit 60 is isolated from conduit 75 so that the status of splitter switch 54 will have no affect upon gear selection. Under the foregoing conditions, the shift actuator 78 is forced to low split (lowest of the Top-2 gears is selected and engaged) by a pressure differential within the actuator 78. If, on the other hand, the higher of the Top-2 gears (i.e. 10th gear) is requested, the lockout solenoid 74 is de-energized and the shift solenoid 70 is energized, thereby coupling conduit 65 to conduit 72. The pressurized air flowing through conduits 65, 72 and 76 forces the shift actuator 78 into high split (highest of the Top-2 gears is selected and engaged). Since conduit 76 is pressurized by actuation of the shift solenoid 70, the status of the splitter switch 54 is immaterial and the lockout solenoid 74 is thus typically de-energized.

Figure 2B:
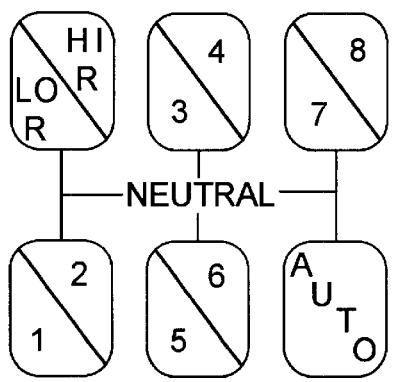
FIG. 2B is a diagrammatic illustration of a shift pattern for the semiautomatic transmission embodiment illustrated in FIG. 2A.

Referring now to FIG. 2B, a known and preferred shift pattern for the 10-speed Top-2 transmission 16 illustrated in FIG. 2A, is illustrated. Transmission 16 has two manually selectable reverse gear ratios, LO R and HI R, eight manually selectable gear ratios, 1–8, and two automatically selectable (Top-2) gear ratios. In reverse gear operation, the driver may select between LO R and HI R via actuation of the splitter switch 54 as is known in the art. In forward gear operation, the manually selectable gear ratios are arranged in pairs to facilitate shifting between gear pairs via the splitter switch 54. For example, if the driver starts forward motion in first gear as is typical, the splitter switch 54 is in the LO position. When the driver wishes to subsequently shift into second gear, shift lever 50 need not be actuated and the splitter switch 54 need only be moved to the HI position. This causes the pressurized air from air source 56 to pass through lockout solenoid 74 as described hereinabove, to thereby actuate the shift actuator 78 and, in turn, shift transmission 16 into second gear. When the driver wishes to subsequently shift into third gear, the splitter switch 54 is returned to the LO position which cuts off the pressurized air to conduit 60 and thereby deactuates the shift actuator 78. The driver then must manually move the gear shift lever 50 into the 3/4 position. Further manual shifting of transmission 16, either in the upshifting or downshifting directions, is carried out in like manner.

When the driver desires the shifting of transmission 16 to be controlled by control computer 12 in either of the Top-2 gear ratios (9th and 10th gears), the gear shift lever 50 is manually moved (typically from the 7/8 position) into the AUTO position. Thereafter, control computer 12 automatically controls shifting between the Top-2 gears in accordance with a known TOP-2 control software resident within memory 62 of control computer 12. In situations where control computer 12 does not include such software, the AUTO position of FIG. 2B is typically replaced with a 9/10 designation and the driver has manual control over all transmission gear ratios including the Top-2 gear ratios (9th and 10th) via splitter switch 54.

Control computer 12 is responsive to several engine and vehicle operating parameters, such as vehicle speed, engine speed, engine fueling, etc., to control shifting between the Top-2 gears of transmission 16 according to known Top-2 control software resident within control computer 12 by controlling the signals on signal paths $45_1$ and $45_2$ as described hereinabove. When such software is enabled for operation, however, control computer 12 controls the Top-2 gears at all times during which vehicle operation requires such gears. One drawback associated with this arrangement is that such control of the Top-2 gears by control computer 12 may, under certain operating conditions (i.e. slippery roads), be considered by the vehicle operator as dangerous. Accordingly, one aspect of the present invention is to provide for the ability to selectively enable and disable control by control computer 12 over shifting between the automatically selectable gear ratios of transmission 16 (hereinafter referred to as "Top-2 control"). In one preferred embodiment of the present invention, Top-2 control may be enabled and disabled via the cruise control ON/OFF switch 32 (FIG. 1), although the present invention contemplates utilizing any shared or existing but otherwise dormant signal path or other dedicated switch line, to control computer 12 as a Top-2 control enable/disable input thereto. One advantage of utilizing the cruise ON/OFF switch 32 additionally as a Top-2 control enable/disable switch is that vehicle operators typically do not operate the vehicle under the control of the cruise control unit 30 when the road conditions are perceived as dangerous, and are conversely much more likely to utilize the cruise control unit 30 when the road conditions are perceived as safe. In a preferred embodiment of system 10, control computer 12 is accordingly responsive to the OFF position of cruise control ON/OFF switch 32 to disable cruise control operation and to further disable Top-2 control as will be described in greater detail hereinafter, and to the ON position of cruise control ON/OFF switch 32 to enable cruise control operation and to further enable Top-2 control as will also be described in greater detail hereinafter.

The present invention recognizes that under certain vehicle operating conditions in which Top-2 control is to be disabled, control computer 12 must account for the possibility that status of the splitter switch 54 may be inconsistent with the currently engaged gear ratio, and control the ensuing disablement of Top-2 control accordingly. The following table illustrates one preferred embodiment of an algorithm for managing both the enablement and disablement of Top-2 control under all possible transmission operating conditions. The table is preferably embodied as a software program resident within memory 62 of control computer 12, and is executable by control computer 12 to provide such control.

TABLE

| | Top-2 Disable | | Top-2 Enable | |
| --- | --- | --- | --- | --- |
| | GEAR SELECT SWITCH | | | |
| GEAR | LO | HI | LO | HI |
| 10 | 1 | 1 | N/A | 4 |
| 9 | 1 | 1 | 4 | N/A |
| ≦8 | 2 | 2 | 4 | 4 |
| SHIFT IN PROGRESS | 3 | 3 | 4 | 4 |

1 = hold current gear until engine load ≦ threshold then deactuate solenoids and inhibit Top-2 control;
2 = inhibit Top-2 control;
3 = complete autoshift in accordance with Top-2 control, then 1; or complete manual shift and inhibit Top-2 control; and
4 = enable Top-2 control.

Referring now to the TABLE, it should be apparent that disablement of Top-2 control is dependent upon whether a shift is currently being executed and, if a shift is not currently being executed, the currently engaged transmission gear. Since control computer 12 typically does not have information relating to the status of the splitter switch 54, it must allow Top-2 control to be disabled in a safe and predictable manner regardless of the status of the splitter switch 54. As mentioned hereinabove, the Top-2 control is selectably disengageable via driver actuation of the cruise control ON/OFF switch to the OFF position. Upon detection of such actuation, control computer 12 is operable to determine the currently commanded gear ratio. Preferably, control computer 12 accomplishes this step, as is known in the art, by computing a ratio of engine speed and vehicle speed, wherein such signals are supplied by the engine speed sensor 36 and vehicle speed sensor 18 respectively. Those skilled in the art will, however, will appreciate that currently engaged gear ratio may be computed or otherwise determined in accordance with other known techniques without detracting from the concepts of the present invention. If, on the other hand, control computer 12 is attempting to execute an autoshift pursuant to Top-2 control, control computer 12 is operable to determine that a shift is in progress in accordance with known techniques.

Once a presently engaged gear ratio has been determined, or it has been determined that a shift is currently in progress, control computer 12 is operable to take appropriate action to disable Top-2 control. For example, if the currently engaged gear ratio corresponds to the highest of the Top-2 gears (i.e. 10th gear), then control computer 12 is preferably operable to compute engine load and hold the currently engaged gear ratio until engine load is less than or equal to a threshold value. In one embodiment, engine load is computed as a ratio of currently commanded engine fueling rate and engine fueling rate under wide open throttle conditions, as is known in the art. Control computer 12 controls engine fueling via output OUT1 according to fueling and timing maps stored within memory unit 62, and thus has constant access to all information required to compute engine load. If engine load is less than or equal to the threshold value, control computer 12 de-energizes both the shift solenoid 70 and lockout solenoid 74 thereby isolating conduit 65 from conduit 72 and coupling conduit 60 to conduit 75. Once the solenoids have been de-energized, control computer 12 inhibits, or deactivates, the Top-2 control software algorithm and the vehicle operator is provided with manual control over the Top-2 gears, as described above, wherein the AUTO position in the gear shift sequence of FIG. 2B becomes 9/10. Upon disablement of the Top-2 control algorithm, subsequent gear engagement depends upon the status of the splitter switch 54. Thus, for example, if Top-2 control is disabled while operating in 10th gear and the splitter switch 54 is in the HI position, then 10th gear will remain engaged after disablement of Top-2 control. If, on the other hand, if Top-2 control is disabled while operating in 10th gear and the splitter switch is in the LO position, then the inconsistent status of the splitter switch 54 will cause the shift actuator to disengage 10th gear, as described above, and engage 9th gear when engine and vehicle speeds are in synchronism. Disengagement of Top-2 control while in the lowest of the Top-2 gears (i.e. 9th gear) also operates according to these principles. Disengagement of Top-2 control while any of the manually selectable gear ratios is currently engaged simply causes disablement of the Top-2 control algorithm since no autoshifting by control computer 12 occurs in these gears and solenoids 70 and 74 are therefore typically de-energized.

If Top-2 control is disabled while a shift is in progress, control computer 12 is operable to determine whether the shift in progress is being executed pursuant to a computer-controlled autoshift between either of the Top-2 gears (i.e. 9th or 10th). In one preferred embodiment, control computer 12 is operable to make such a determination by monitoring vehicle and engine speed, and determining therefrom a target gear ratio. If the target gear ratio is either of the Top-2 gears, then the shift in progress is being executed pursuant to a computer-controlled autoshift. Otherwise, the shift in progress is being executed pursuant to a manual shift.

In cases where the shift in progress is being executed pursuant to a computer-controlled autoshift, control computer 12 is operable to complete the shift in accordance with the Top-2 control algorithm, and thereafter process the disablement of Top-2 control according to the currently engaged gear ratio (i.e. 9th or 10th) as described hereinabove. On the other hand, in cases where the shift in progress is being executed pursuant to a manual shift, control computer 12 is operable to allow the shift to be completed and thereafter disable Top-2 control.

From the foregoing, it should now be apparent that an important aspect of the present invention is that the engine load must be less than a threshold value prior to de-energizing the solenoids 70 and 74 whenever disablement of Top-2 control is requested while one of the automatically selectable gears (i.e. 9th or 10th) is currently engaged. The reason for this is to guarantee that fuel is not being delivered to the engine 14, and the engine 14 is accordingly not delivering torque to the transmission 16, when control computer 12 attempts to de-energize the solenoids 70 and 74 (i.e. by ensuring that the engine fueling rate is less than some fueling rate threshold). Attempts at de-energizing either solenoid 70 or 74 when the engine 14 is torque-locked with the transmission 16 would likely result in unsuccessful placement of the corresponding solenoid controlled valve, thereby leading to unpredictable gear engagement results, and/or cause solenoid damage over time. This potential problem is overcome by ensuring that the fuel is not being delivered to the engine when control computer 12 attempts to de-energize the solenoids 70 and 74. In one embodiment, the engine load threshold value is set at 0%, thereby ensuring a zero fueling rate, although the present invention contemplates setting this threshold value at a higher percentage value with a suitable time delay prior to solenoid de-energization. Alternatively, control computer 12 may be responsive to a predetermined position of the accelerator pedal 20 (i.e. 0% accelerator pedal), via the accelerator pedal position signal provided thereto on signal path 23, to determine when a zero engine fueling rate condition exists. However, in using accelerator pedal position rather than engine load as an indication of zero engine fueling, it should be noted that there may exist certain engine operating conditions wherein the accelerator pedal position signal indicates 0% accelerator pedal while the engine is still being fueled. Due to such possible conditions, the present invention contemplates providing for some predetermined time delay after detection of 0% accelerator pedal prior to de-energizing solenoids 70 and 74 to thereby ensure 0% engine fueling. Those skilled in the art will recognize that other known techniques may be used to determine the existence of zero engine fueling conditions, and that such alternate techniques may be used to practice the present invention without detracting from the fundamental concepts thereof.

Top-2 control is also selectably engageable via driver actuation of the cruise control ON/OFF switch to the ON position. Upon detection of such actuation, control computer 12 is simply operable to enable the Top-2 control algorithm. The TABLE includes a pair of N/A designations indicating conditions that are not applicable because they would not exist in normal operation of system 10. For example, during manual control of transmission 16, the highest of the Top-2 gears would not be engaged if the splitter switch 54 was in the LO position. Likewise, the lowest of the Top-2 gears would not be engaged if the splitter switch 54 was in the HI position. Also, it should be pointed out that if a manual shift is in progress when the Top-2 control is enabled via the cruise control ON/OFF switch 32, control computer 12 is operable to allow completion of the shift before enabling the Top-2 control algorithm.

Figure 3:
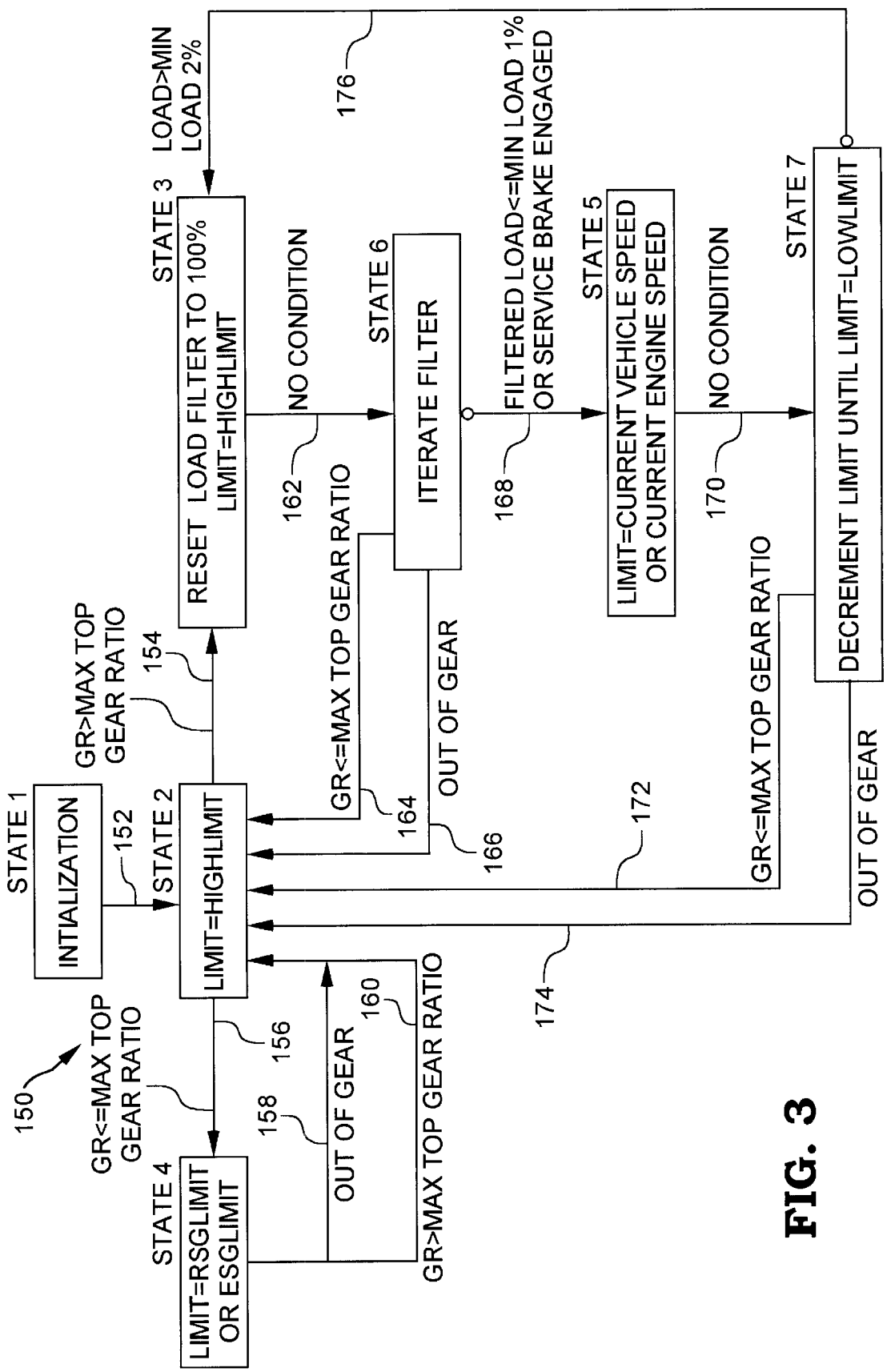
FIG. 3 is a state flow control diagram illustrating one embodiment of an algorithm for instituting vehicle or engine speed limits under conditions wherein the automatically selectable gear ratios of the transmission have been switched to manual control thereof by the driver, in accordance with another aspect of the present invention.

Referring now to FIG. 3, there is illustrated a state flow diagram illustrating one embodiment of another aspect of the present invention. Specifically, FIG. 3 illustrates an algorithm 150 for instituting vehicle or engine speed limits under conditions wherein the automatically selectable gear ratios of the transmission have been switched to manual control thereof by the driver (i.e. Top-2 control has been disabled). State flow diagram 150 institutes a so-called gear down protection algorithm as set forth in U.S. Pat. No. 5,564,999 to Bellinger et al., the contents of which are incorporated herein by reference. The gear down protection algorithm allows the vehicle to be operated at higher than normally desired vehicle speeds, or alternatively allows the engine to be operated at higher than normally desired engine speeds, during periods when there is a legitimate need for increased performance. Examples of legitimate high vehicle speed or high engine speed scenarios include downshifting in order to aid in climbing an uphill grade or accelerating with the goal of upshifting. A maximum vehicle speed or maximum engine speed is also imposed for all non-top gears, but only during steady state conditions (defined as light engine load existing for a predetermined period of time). During transient conditions (discerned by recognizing gear changes and by high engine load conditions), the algorithm provides for lenience from the normal maximum vehicle or engine speed limits for non-top gears. Such lenience provides for increased performance during periods when it is legitimately needed by the driver. During steady state operating conditions, the use of non-top gears during high vehicle or engine speed driving is correspondingly prevented by limiting the vehicle road speed or engine speed if the transmission is not in top gear.

The algorithm limits either the vehicle road speed or engine speed to a low enough value so that the driver is thereby encouraged to shift to top gear in order to operate the vehicle or engine at the desired higher speed (steady state conditions). Because system 10 may be programmed to select the amount of lenience or the maximum vehicle or engine speeds for each gear, these quantities may be selected independently of the driver and therefore vehicle or engine operation can be controlled to a limited extent in order to improve fuel economy. It should be understood that it is the recognition of steady state and transient operating conditions that allows system 10 to provide lenience from the maximum speed limits when such lenience is required during legitimate requests for increased performance.

Specifically, operation of the vehicle in non-top gear and steady state high speed conditions results in system 10 limiting vehicle road speed or engine speed, thus encouraging the driver to shift into top gear. On the other hand, operation of the vehicle in non-top gear and transient high speed conditions are allowed by system 10 (up to a maximum high limit vehicle or engine speed) for as long as the transient conditions persist. Once the transient conditions disappear, however, and the vehicle or engine is operating under steady state conditions, system 10 once again operates to limit road speed or engine speed until the transmission is manually shifted into top gear.

The state flow diagram 150 has seven states which are summarized as follows:

State 1

The control system is activated at engine startup and under conditions described hereinabove when the Top-2 logic is disabled, wherein system variables are initialized, and initial readings are taken of the system sensor inputs. The system then proceeds to state 2 via path 152.

State 2

An operating parameter, Limit, is set to a High Limit value, which, in one embodiment, is a constant vehicle speed selected by the vehicle owner and programmed into the control system using a special tool not available to the driver. Alternatively, Limit may be set to a constant engine speed value selected and programmed as just described. The High Limit value is thus equal to the maximum allowable vehicle road speed, or alternatively the maximum allowable engine speed, when not in top gear.

State 2 may be exited by one of two paths. If the transmission gear ratio (GR) currently selected by the driver is greater than the maximum top gear ratio plus a predetermined tolerance (i.e. a non-top gear has been selected (gear down operation)), the system proceeds to state 3 via path 154. On the other hand, if GR is less than or equal to the maximum top gear ratio (i.e. top gear has been selected), the system proceeds to state 4 via path 156. During the time when system 10 is in state 2 the vehicle speed, or alternatively the engine speed, is limited to the High Limit value.

State 3

The control system enters state 3 only when the transmission is not in top gear (gear down operation). The present invention makes several decisions based upon load on the engine, i.e. engine load percentage. The engine load percentage is measured, in one embodiment, as the current fueling demanded by the driver (requested torque) as compared to the maximum commandable fueling (maximum requestable torque). The engine load percentage is filtered by a load filter in order to smooth out any rapid fluctuations, and therefore converts the actual instantaneous load percentage to load percentage trend information (see state 6). In situations where the fueling (requested torque) is steady state, the filtered load percentage (trend information) converges with the instantaneous load percentage. In state 3, the load filter is reset to indicate a filtered load of 100%. Additionally, the vehicle speed limit or engine speed limit (Limit) is set equal to the High Limit value. State 3 is unconditionally exited via path 162 to state 6.

State 4

The control system 10 remains in state 4 as long as the driver has selected the top gear of transmission 16. In one embodiment of state 4, the vehicle speed limit (Limit) is set to a road speed governor limit (RSG Limit) value, which is a constant selected by the vehicle owner or fleet manager and programmed into the control system 10. The RSG Limit value is equal to the maximum allowable vehicle road speed in top gear. In an alternate embodiment, Limit is set to an engine speed governor limit (ESG Limit), which is a constant selected by the vehicle owner or fleet manager and programmed into the control system 10. The ESG Limit value is equal to the maximum allowable engine speed in top gear.

State 4 may only be exited upon the occurrence of one of two conditions. First, if the transmission 16 is taken out of gear (i.e. gear disengagement), the control system 10 returns to state 2 via path 158. An out-of-gear condition is determined by the occurrence of a rapid change in the calculated gear ratio. Secondly, if the transmission 16 is shifted out of top gear (gear down operation), the control system 10 advances to state 2 via path 160.

State 5

State 5 is only entered via path 168 when the driver is not in top gear and the driver is not requesting a high engine load percentage (as indicated by filtered load<=MIN LOAD 1%). This means that the driver is attempting to operate in a non-top gear (gear down operation) for an extended period of time. Because gear down operation at high road speeds is desired only under high engine load conditions, such as downshifting to climb an uphill grade or accelerating with the goal of upshifting, the control system 10 attempts to encourage the driver to upshift by taking away road speed or engine speed (in state 7). In preparation for this time (to ensure no discontinuity), the value Limit is set equal to the current vehicle speed in one embodiment of step 5. In an alternate embodiment, Limit is set equal to the current engine speed. Typically, the current vehicle speed or the current engine speed will be slightly lower than the High Limit, due to the vehicle decelerating pursuant to a reduction in requested engine load percentage. The control system 10 advances unconditionally to state 7 via path 170.

State 6

State 6 is always entered from state 3 via path 162, and this transition is unconditional. The load filter is iterated at state 6 preferably according to the following filter equation:

$$f_n = (LOAD \%_n * \alpha) + (f_{n-1} * (1-\alpha)),$$

where $f_n$=the new (iterated) filtered engine load, $f_{n-1}$=the filtered engine load before the current iteration, LOAD $\%_n$=the current instantaneous load percentage as measured by fueling to the engine with respect to the maximum allowed fueling at the current engine r.p.m., and $\alpha$=a predetermined scaling factor.

It will be appreciated by those skilled in the art that if LOAD $\%_n$ in remains constant, then the filtered load $f_n$ will remain constant and equal to LOAD $\%_n$. However, if LOAD $\%_n$ changes, the effect of this change upon the next iteration of the filtered load is determined by the predetermined scaling factor $\alpha$. The larger the value of $\alpha$, the more impact any instantaneous change in LOAD $\%_n$ will have on the filtered load value $f_n$. However, with $0<\alpha<1$, the filtered load $f_n$ will always eventually converge to the LOAD $\%_n$ if the engine fueling is held at a steady state fueling condition. The value of the scaling factor $\alpha$ determines how fast these two values will converge. On the other hand, if the requested engine load percentage is continuously changing (due to actuation of the accelerator pedal 20), the filtered load value $f_n$ will converge on the average value of the requested engine load percentage.

State 6 may be exited by one of three paths. First, if the gear ratio GR is less than or equal to the maximum top gear ratio plus a predetermined tolerance (i.e. top gear has been selected), the system proceeds to state 2 via path 164. Secondly, if the transmission 16 is shifted out of gear (i.e. gear disengagement), the control system 10 advances to state 2 via path 166. An out-of-gear condition is determined by the occurrence of a rapid change in the measured gear ratio. Finally, if the filtered load $f_n$ is less than or equal to the predetermined variable MIN LOAD 1%, or if the service brake 24 has been engaged, the control system 10 moves to sate 5 via path 168. Path 168 is the lowest priority transition, and therefore this condition is evaluated after the first two exit conditions have been evaluated. MIN LOAD 1% may be set at, for example, 85% and is the point at which it is determined that the driver is not in a high engine load driving situation (and thus no longer in a transient situation), therefore the control system 10 moves to states 5 and 7 in order to take away vehicle speed or engine speed in order to encourage the driver to shift into top gear.

It will be appreciated by those skilled in the art that the control system 10 will remain in state 6 as long as a non-top gear is selected, the requested load percentage is above MIN LOAD 1%, the service brake 24 is not engaged and the vehicle is currently in gear. State 6 therefore represents a legitimate non-top gear, high road speed transient driving condition.

State 7

State 7 is only entered when the control system 10 is encouraging the driver to upshift due to the inherent steady state condition about to occur. In order to encourage the driver to shift into top gear, Limit is ramped from the High Limit value to a Low Limit value. In one embodiment, the Low Limit value is a low vehicle speed limit that is pre-programmed into the control system 10. Alternatively, the Low Limit value is a low engine speed limit, also pre-programmed into the control system 10. By taking away either vehicle speed or engine speed, the driver is prevented from operating at high road speeds (or high engine speeds) in non-top gears.

If Limit were immediately set equal to Low Limit in state 7, the road speed governor would abruptly cut the fuel supply to the engine, resulting in an unpleasant driver perception. The value of Limit is therefore slowly decremented in state 7 at a predetermined rate until it reaches Low Limit. As the vehicle begins to lose road speed, or the engine begins to lose engine speed, the driver is thereby encouraged to shift into top gear. Once in top gear, the driver may operate the vehicle at any speed less than or equal to the RSG Limit, or alternatively operate the engine at any engine speed less than or equal to the ESG Limit.

State 7 may be exited via any of three paths. First, if the gear ratio GR is less than or equal to the maximum top gear ratio plus a predetermined tolerance (i.e. top gear has been selected), the system proceeds to state 2 via path 172. Secondly, if the transmission 16 is shifted out of gear (gear disengagement), the control system 10 advances to state 2 via path 174. An out-of-gear condition is determined by the occurrence of a rapid change in the calculated gear ratio. Finally, if the filtered engine load is greater than a predetermined variable MIN LOAD 2%, the control system 10 moves to state 3 via path 176. Path 176 is the lowest priority transition, and therefore this condition is evaluated only after the first two exit conditions are evaluated. MIN LOAD 2% is greater than MIN LOAD 1%, and may be set at, for example, 90%. MIN LOAD 2% is the point at which it is determined that the driver is once again in a high engine load driving situation in which operation in a lower gear is appropriate. Therefore, the control system 10 moves to state 3 in order to reset Limit to High Limit and to begin monitoring for continued legitimate gear down operation.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, while the algorithm for enabling and disabling Top-2 control as well as the algorithm for instituting the gear down protection algorithm of FIG. 3 whenever Top-2 control is disabled may be permanently installed in the memory unit 62 of control computer 12, the present invention contemplates that such algorithms may be loaded into an existing control computer 12 at any time via a known service or recalibration tool so that a fleet owner/manager may add or remove such algorithms at any time. As a specific example, the control computer 12 may be responsive to a first programming signal or set of signals provided by a service/recalibration tool, or similar such device, to be responsive to the cruise control ON/OFF switch 54 as described hereinabove, and may be responsive to a second programming signal or set of signals to enable execution of the Top-2 control algorithm at all times. Likewise, the control computer 12 may be responsive to a third programming signal or set of signals provided by a service/recalibration tool, or similar such device, to enable any version of the gear down protection algorithm of FIG. 3 whenever the Top-2 control algorithm is inhibited, and may be responsive to a fourth programming signal or set of signals to inhibit the gear down protection algorithm even when the Top-2 control algorithm is inhibited.

What is claimed is:

1. A system for selecting between automatic and manual control of a number of gear ratios of a semiautomatic transmission, comprising:
    an internal combustion engine coupled to a semiautomatic transmission having a number of manually selectable gear ratios and a number of automatically selectable gear ratios;
    means for determining an engine fueling rate;
    a switch having a first switch position and a second switch position;
    a memory unit including a software algorithm for controlling shifting between the number of automatically selectable gear ratios; and
    a control computer responsive to said first switch position to execute said software algorithm and thereby control shifting between the automatically selectable gear ratios, said control computer responsive to said second switch position to inhibit execution of said software algorithm such that said number of automatically selectable gear ratios are manually selectable if said engine is currently engaged with any of said number of automatically selectable gear ratios and said fueling rate is less than a threshold fueling rate.

2. The system of claim 1 wherein said means for determining an engine fueling rate includes means for determining engine load;
    and wherein said control computer is responsive to said second switch position to inhibit execution of said software algorithm if said engine is currently engaged with any of said number of automatically selectable gear ratios and said engine load is less than an engine load threshold.

3. The system of claim 1 further including an accelerator pedal responsive to actuation thereof to produce an accelerator pedal signal;
    and wherein said means for determining an engine fueling rate includes means responsive to said accelerator pedal signal for determining a position of said accelerator pedal;
    and wherein said control computer is responsive to said second switch position to inhibit execution of said software algorithm if said engine is currently engaged with any of said number of automatically selectable gear ratios and said accelerator pedal position is below an accelerator pedal position threshold for at least a predetermined time period.

4. The system of claim 1 further including a cruise control unit responsive to a cruise control ON/OFF switch to correspondingly enable/disable said cruise control unit;
    and wherein said switch is said cruise control ON/OFF switch with said first switch position corresponding to a ON position of said cruise control ON/OFF switch and said second switch position corresponding to an OFF position of said cruise control ON/OFF switch.

5. The system of claim 1 further including at least one solenoid actuatable by said control computer to select at least one of said number of automatically selectable gear ratios and deactuatable by said control computer to deselect said at least one of said number of automatically selectable gear ratios;
    and wherein said control computer is responsive to said second switch position to deactuate said at least one solenoid and thereafter inhibit execution of said software algorithm if said engine is engaged with any of said number of automatically selectable gear ratios and said fueling rate is less than said threshold fueling rate.

6. The system of claim 1 wherein said control computer is further responsive to said second switch position to inhibit execution of said software algorithm such that said number of automatically selectable gear ratios are manually selectable if said engine is currently engaged with any of said number of manually selectable gear ratios.

7. The system of claim 1 wherein said control computer is further responsive to said second switch position to complete an autoshift according to said software algorithm if said control computer is currently executing said autoshift, and thereafter inhibit execution of said software algorithm such that said number of automatically selectable gear ratios are manually selectable if said fueling rate is less than a threshold fueling rate.

8. The system of claim 1 wherein said control computer is further responsive to said first switch position to enable execution of said software algorithm.

9. The system of claim 1 wherein said control computer is responsive to a first program signal to respond to said switch as stated and to a second program signal to enable execution of said software algorithm at all times.

10. A system for selecting between automatic and manual control of a number of gear ratios of a semiautomatic transmission, comprising:
    an internal combustion engine coupled to a semiautomatic transmission having a number of manually selectable gear ratios and a number of automatically selectable gear ratios;
    means for determining engine load;
    means for determining one of engine speed and vehicle road speed;
    a memory unit including a software algorithm for controlling shifting between the number of automatically selectable gear ratios; and
    a control computer operable in a first mode to execute said software algorithm and thereby control shifting between the automatically selectable gear ratios, and in a second mode to inhibit execution of said software algorithm such that said number of automatically selectable gear ratios are manually selectable, said control computer further operable in said second mode to determine a currently selected gear ratio of said transmission and reduce one of an engine speed limit and vehicle speed limit if a numerically lowest one of the selectable gear ratios is not currently selected and said engine load is below an engine load threshold, and to further reduce one of engine speed and vehicle speed if said one of engine speed and vehicle speed is above a corresponding one of said engine speed and vehicle speed limit.

11. The system of claim 10 wherein said means for determining engine load includes:
    means for calculating an instantaneous engine load percentage; and
    a filter operable to filter the instantaneous engine load percentage and provide the engine load therefrom.

* * * * *